United States Patent Office 3,567,693
Patented Mar. 2, 1971

3,567,693
PROCESS FOR PREPARING POLYESTER FILM HAVING IMPROVED SLIP PROPERTIES
Aleksander Piirma, 3528 Adeline Drive, Stow, Ohio 44224
No Drawing. Continuation-in-part of application Ser. No. 624,163, Mar. 20, 1967, which is a continuation-in-part of application Ser. No. 329,863, Dec. 11, 1963. This application Dec. 6, 1968, Ser. No. 782,006
Int. Cl. C08g 17/01
U.S. Cl. 260—75      5 Claims

ABSTRACT OF THE DISCLOSURE

The invention relates to a method of preparing a polyester resin having finely divided particles dispersed therein by adding a soluble alkaline earth metal compound and a free dicarboxylic acid to a glycol terephthalate and condensing the glycol ester to form high molecular weight resin. Films formed from the resins have good slip properties.

---

This application is a continuation-in-part of my application Ser. No. 624,163, filed Mar. 20, 1967, now abandoned which is a continuation-in-part of my application Ser. No. 329,863 filed Dec. 11, 1963, now abandoned.

This invention relates to linear polymeric polyester resins. More particularly the invention relates to polyester films having improved slip characteristics.

Linear polymeric polyesters are compounds containing in their structural units ester groups of the type derived from interesterification of an organic dicarboxylic acid with dihydric glycols. Films are formed from such polyester resins by extrusion processes in which the resin is heated and fused and extruded through a die to form a sheet which is generally stretched or oriented to form relatively thin films. These films are smooth and have such affinity for each other that they cohere when brought into contact with each other even when under only very slight pressure. Thus, winding the film into a roll under the ordinary tension employed to form a tight roll causes the film surfaces to adhere to one another.

Polyester films are useful in a variety of applications. However, in some applications difficulties are encountered in handling and using the films because the surfaces of the films in contact with each other cohere and cling together so tightly that difficulty is had in separating sheets of the film from each other. Particularly in uses wherein the polyester film forms a substrate or backing layer, as in photographic film or magnetic recording tape, adherence of the layers of film to each other causes difficulties, and often machines operating with such films function erratically.

It is an obect of the present invention to provide a method of preventing or lessening the affinity of polyester film surfaces for one another. Another object is to provide a polyester film having good slip characteristics. Other objects will appear as the description of the invention proceeds.

The objects are accomplished by generating solid particles, in finely divided form in situ in the polyester resin during the production of the resin and the subsequent forming of the resin into film. Thus, according to the invention, slip characteristics are imparted to a polyester film by generating within the resin of which the film is made finely divided solid particles of salts of an alkaline earth metal and a dicarboxylic acid.

The particles are very small and preferably have an average size of not more than ten microns, measured in the longest dimension of the particles. The most preferred particles are particles which have a length of from about two to about six microns and a width of from about one-half to about one micron.

In order for the film to have desired slip properties, the surface of the film will contain at least about 15,000 of the particles per square inch of film surface area. The films are generally oriented in at least one direction.

The invention is illustrated by the following examples.

EXAMPLE 1

A glass reaction tube approximately 35 centimeters long having an inside diameter of 38 millimeters, equipped with a sidearm, a nitrogen inlet tube and a stirrer was charged with 50 grams of dimethyl terephthalate, 40 grams of ethylene glycol, 0.018 gram of zinc acetate dihydrate dissolved in 0.5 milliliter of ethylene glycol and 0.0125 gram of antimony trioxide dissolved in 2.1 milliliters of ethylene glycol. The mixture was stirred and the reaction tube was heated by a diethylene glycol vapor bath. Nitrogen gas was slowly passed over the mixture in the reaction tube and after two hours the ester interchange was complete. Then 0.0155 gram of calcium acetate monohydrate dissolved in 0.45 milliliter of ethylene glycol was added to the hot reaction product and several minutes later 0.3 gram of terephthalic acid dissolved in 2 milliliters of hot ethylene glycol was added. The reaction mixture immediately became hazy. The pressure in the system was then reduced over a period of 20 minutes to 50 millimeters of mercury pressure and the temperature was raised to 244° C. Then the mixture was heated to 280° C. by a dimethyl phthalate vapor bath and the pressure was reduced to one millimeter of mercury pressure. The condensation was carried out at 280° C. and one millimeter of mercury pressure for two hours. The polymer obtained had a color rating of one on a laboratory color scale and had an intrinsic viscosity of 0.565 determined in a 60/40 mixture of phenol/tetrachloroethane at 30° C. An amorphous sample of this polymer under 100 times magnification showed bright uniform crystallites homogeneously distributed throughout the resin.

EXAMPLE 2

An apparatus of the same type used in Example 1 was used for this experiment. Fifty grams of dimethyl terephthalate, 40 grams of ethylene glycol, 0.0179 gram of zinc acetate dihydrate dissolved in 0.5 milliliter of ethylene glycol and 0.0125 gram of antimony trioxide dissolved in 2.1 milliliters of ethylene glycol were charged into the reaction flask. The mixture was stirred and the reaction tube heated by a diethylene glycol vapor bath. Nitrogen gas was slowly passed over the mixture in the reaction tube and after 90 minutes of heating the theoretical amount of methanol had distilled out of the reaction mixture. Heating was then continued to distill out the excess glycol. After 30 minutes of heating 14 milliliters of ethylene glycol had distilled out. At this point a slurry of 0.0105 gram of calcium acetate monohydrate dissolved in 1.0 milliliter of ethylene glycol and 0.015 gram of solid terephthalic acid having an average particle size between 40 and 100 mesh was added to the reaction mixture. The reaction mixture became hazy. The pressure in the system was reduced to 50 millimeters of mercury pressure and the temperature was raised to 244° C. over a period of 20 minutes. Then the mixture was heated to 280° C. by a dimethyl phthalate vapor bath and the pressure in the system was reduced to one millimeter of mercury pressure over a period of five minutes. The condensation reaction was carried out at 280° C. and one millimeter of mercury pressure for 90 minutes. The polymer obtained had a color rating of 2 on a laboratory color scale and an intrinsic viscosity of 0.60. An amorphous sample of this polymer under 100 times magnification showed bright uniform crystallites distributed throughout the resin.

Films formed from the above resins do not stick together and have good slip characteristics. The examples illustrate the invention particularly with respect to the use of calcium acetate monohydrate. Other alkaline earth metal compounds soluble in the reaction mixture can be used. The compounds can be added in various forms such as a salt of an aliphatic acid or in the form of the metal oxide or hydroxide. If desired, the metal can be used, but it will be necessary to allow sufficient time for the metal to react to form a soluble compound. Representative examples of compounds that can be used are organic compounds such as calcium acetate, barium acetate, strontium acetate, calcium propionate, barium propionate, strontium propionate, calcium glycoloxide, barium glycoloxide and strontium glycoloxide and inorganic compounds such as the oxides and hydroxides of calcium, barium and strontium.

The amount of the alkaline earth compound used can be varied over a wide range. Thus the amount can vary from 0.01 to 0.5 mol percent of the mols of phthalate esters used (calculated as the alkaline earth metal). The preferred amount used will be within the range of 0.05 to 0.2 mol percent based on the phthalate esters used.

The amount of dicarboxylic acid such as terephthalic acid used will be an amount at least equivalent to the amount of the alkaline earth metal used. A slight excess can be used if desired. Thus the dicarboxylic acid is used in the range of from 0.01 to 0.6 mol percent of the mols of phthalate esters used. It is generally preferred to use a slight excess of the acid because the excess will react with the glycol or glycol esters present and become a part of the polymer chain during the condensation reaction. The acid can be added as a finely divided solid or dissolved in a suitable solvent such as ethylene glycol or bis hydroxyethyl terephthalate. If desired, it can be added in suspension in a carrier such as diphenyl methane.

The examples illustrate the invention with respect to the use of terephthalic acid. Other dicarboxylic acids which form insoluble salts with the alkaline earth metals can be used. Representative examples of such acids are 4,4′-diphenyl dicarboxylic acid, pyromellitic acid, isophthalic acid and the naphthalic acids.

The examples illustrate the invention particularly with respect to polyethylene terephthalate. It can be used with other linear film-forming polyesters such as polyesters obtainable from an organic dicarboxylic acid or ester-forming derivative thereof and a glycol. Representative examples of acids from which such polyesters may be derived are terephthalic acid, isophthalic acid, 1,5-naphthalene dicarboxylic acid, 2,6-naphthalene dicarboxylic acid, 4,4′-diphenyl dicarboxylic acid, 4,4′-diphenic acid, 4,4′-benzophenone dicarboxylic acid, 1,2-di(-p-carboxy phenoxy) ethane, 1,2-di(p-carboxy phenyl) ethane and 4,4′-dicarboxy diphenyl ether. Representative examples of glycols from which such polyester resins can be prepared are polymethylene glycols such as ethylene glycol, propylene glycol, the butylene glycols and decamethylene glycol, and branched chain glycols such as neopentyl glycol, 2-methyl, 2-ethyl propane diol-1,3 and 2,2-diethyl propane diol-1,3 and cyclohexane dimethanol. The polyesters can be obtained from one or more of the organic dicarboxylic acids or derivatives thereof and one or more glycols. Thus the linear film-forming polyester resin can be a homopolyester or a copolyester. The resin can be modified by substituting an aliphatic dicarboxylic acid for part of the aromatic dicarboxylic acid. Aliphatic dicarboxylic acids that can be used are acids such as adipic acid, sebacic acid and azelaic acid. Representative examples of linear film-forming polyesters are polyethylene terephthalate, polymeric ethylene terephthalate-ethylene isophthalate copolyesters, polymeric ethylene terephthalate-neopentyl terephthalate copolyesters, copolyesters of ethylene glycol units, neopentyl glycol units, terephthalic acid units and sebacic acid units which contain the glycol units in various ratios and the terephthalic acid units constitute a major proportion of the acid units in the copolyester, polyethylene terephthalate - 2,6 - naphthalate copolyesters which contain the acid units in various ratios, polytetramethylene terephthalate, tetramethylene terephthalate-sebacate copolyesters, cyclohexane dimethanol terphthalate, polyethylene bibenzoate and ethylene bibenzoate-neopentyl bibenzoate copolyesters. The order of addition of the alkaline containing material and the dicarboxylic acid is not critical and changing the order of addition has little effect on the particle size and amount of precipitate formed. However, it is usually preferred to add the alkaline earth containing material first, although the dicarboxylic acid can be added first if desired. When the acid is added first an excess of the acid is added to insure obtaining reproducible results. It is thought that some of the acid reacts with the mixture and thus is not free to react with the alkaline earth metal compound.

In the practice of the invention the preparation of the polyester resin is carried out in accordance with the usual known techniques. Thus the reactions are preferably carried out in the absence of oxygen, generally in an atmosphere of an inert gas such as nitrogen or the like in order to lessen darkening of the resin and to make it possible to obtain a high molecular weight pale or colorless product. The polymerization or condensation reaction is carried out under reduced pressure, generally below 10 millimeters of mercury pressure, and usually below one millimeter of mercury pressure at a temperature in the range of from 260 to 290° C., although other pressures and temperatures can be used according to known practice. The resin is polymerized to a high molecular weight product having an intrinsic viscosity of at least 0.3 and generally of 0.4 or higher as measured in a 60/40 phenol-tetrachloroethane mixed solvent at 30.0° C.

The examples illustrate the process of the invention and show the addition of the free acid and alkaline earth metal compound to the bis glycol ester. The bis glycol ester may contain low molecular weight polymer such as dimer and trimer. If desired, the free acid and alkaline earth compound can be added to oligomers and these materials condensed to high molecular weight resin which can then be formed into film having the improved slip properties.

While certain representative embodiments and details have been shown for the purpose of illustrating the invention it will be apparent to those skilled in this art that various changes and modifications may be made therein without departing from the spirit or scope of the invention as defined in the appended claims.

What I claim is:

1. The method of preparing a terephthalate polyester resin having small solid particles dispersed therein which were formed in situ in the resin said particles having an average particle size of not more than 10 microns, which comprises forming a glycol terephthalate, adding (A) from 0.01 to 0.05 mol percent of the glycol terephthalate (calculated as alkaline earth metal) of an alkaline earth material soluble in the glycol ester selected from the group consisting of alkaline earth metals, alkaline earth metal oxides, alkaline earth metal hydroxides, alkaline earth metal glycol oxides and alkaline earth metal salts of aliphatic acids and (B) an acid selected from the group consisting of terephthalic acid, 4,4′-diphenyl dicarboxylic acid, pyromellitic acid, isophthalic acid and a naphthalic acid in an amount at least equivalent to the amount of alkaline earth metal added which is in the range of from 0.01 to 0.6 mol percent based on the mols of terephthalate ester used and subjecting the mixture to condensation reaction at a temperature of from about 260 to 290° C. at a pressure below 10 millimeters of mercury pressure to form high molecular weight polyester resin having an intrinsic viscosity of at least 0.4 and shaping the resin in the form of a film.

2. The method of claim 1 in which the glycol terephthalate is an oligomer.

3. The method of claim 1 in which the glycol ester used is bis hydroxyethyl terephthalate and the acid added is terephthalic acid.

4. The method of claim 3 in which the surface of the film contains from at least about 15,000 particles per square inch of surface area, said particles having an average length of from about 2 to about 6 microns and a width of from about ½ to about 1 micron.

5. The method of preparing an ethylene terephthalate polyester film having small solid particles dispersed therein, said particles having an average particle size of not more than 10 microns, which comprises reacting dimethyl terephthalate with ethylene glycol under ester interchange conditions to form bis hydroxyethyl terephthalate, adding from 0.01 to 0.05 mol percent of calcium acetate based on the glycol terephthalate (calculated as calcium metal), and an amount of terephthalic acid which is at least equivalent to the calcium added, which is in the range of from 0.01 to 0.6 mol percent based on the terephthalate ester condensing the glycol terephthalate at a temperature of about 260 to 290° C. at a pressure below 10 millimeters of mercury pressure to high molecular weight polyester resin having an intrinsic viscosity of at least 0.4 containing small particles formed in situ in the resin and shaping the resin in the form of a film.

References Cited

UNITED STATES PATENTS

| | | | |
|---|---|---|---|
| 3,070,575 | 12/1962 | Cramer | 260—47 |
| 3,314,919 | 4/1967 | Most | 260—45.85 |
| 3,024,220 | 3/1962 | Cramer | 260—75 |
| 3,342,782 | 9/1967 | Barkey | 260—75 |
| 3,515,700 | 6/1970 | Yokouchi et al. | 260—75 |

FOREIGN PATENTS

| | | |
|---|---|---|
| 1,362,760 | 4/1964 | France. |

WILLIAM H. SHORT, Primary Examiner

M. GOLDSTEIN, Assistant Examiner

U.S. Cl. X.R.

260—40

PO-1050
(5/69)

UNITED STATES PATENT OFFICE
CERTIFICATE OF CORRECTION

Patent No. 3,567,693      Dated March 2, 1971

Inventor(s) Aleksander Piirma

It is certified that error appears in the above-identified patent and that said Letters Patent are hereby corrected as shown below:

Column 1, after inventor's name and address the name of the assignee has been omitted. The name of the assignee should be inserted as -- The Goodyear Tire & Rubber Company, Akron, Ohio 44

Column 2, line 23 the amount "0.3" should be -- 0.03 --.

Signed and sealed this 7th day of March 1972.

(SEAL)
Attest:

EDWARD M. FLETCHER, JR.
Attesting Officer

ROBERT GOTTSCHALK
Commissioner of Pater